US006317755B1

United States Patent
Rakers et al.

(10) Patent No.: US 6,317,755 B1
(45) Date of Patent: Nov. 13, 2001

(54) METHOD AND APPARATUS FOR DATA BACKUP AND RESTORATION IN A PORTABLE DATA DEVICE

(75) Inventors: Patrick L. Rakers, Kildeer; Timothy James Collins, Lockport; Daniel J. Russell, Woodstock; Sam DiRaimondo, Cary, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/360,571

(22) Filed: Jul. 26, 1999

(51) Int. Cl.[7] ................................................. G06F 17/30
(52) U.S. Cl. .................. 707/204; 707/100; 707/200; 705/52; 705/57; 711/100; 455/428
(58) Field of Search ..................... 707/9, 100, 101, 707/103, 202, 204, 8, 104, 200, 205; 711/100; 705/51, 52, 57; 370/200, 249, 405; 455/428

(56) References Cited

U.S. PATENT DOCUMENTS

| | | | |
|---|---|---|---|
| 4,839,640 | * | 6/1989 | Ozer et al. ............................. 340/5.33 |
| 5,448,045 | * | 9/1995 | Clark .................................... 235/382 |
| 5,455,946 | * | 10/1995 | Mohan et al. ......................... 707/202 |
| 5,608,720 | * | 3/1997 | Biegel et al. ......................... 370/249 |
| 5,724,581 | * | 3/1998 | Kozakura .............................. 707/202 |
| 5,813,009 | * | 9/1998 | Johnson et al. ...................... 707/100 |
| 6,253,193 | * | 6/2001 | Ginter et al. ............................ 705/57 |
| 6,272,341 | * | 8/2001 | Treadgill et al. ..................... 455/428 |

OTHER PUBLICATIONS

Fancher, Carol, "In your pocket: smartcards", IEEE Spectrum, Feb. 1997, vol.: 34, Issue: 2, pp. 47–53.*
Low, David A., "An Object Oriented Model for Distributed Backup and Archive", COMPCON '95. Digest of Papers 'Technologies for the Information Superhoghway', Mar. 5–9, 1995, pp. 428–433.*
Mihara, Masaaki et al., "Row–Redundancy Scheme for High–Density Flash Memory", 1994 IEEE International Solid–state Circuits Conference, Digest of Technical Papers, Feb. 16–18, 1994, pp. 150–515.*

* cited by examiner

Primary Examiner—Hosain T. Alam
Assistant Examiner—Shahid Alam
(74) Attorney, Agent, or Firm—Terri S. Hughes (57) ABSTRACT

A portable data device (300) having a memory (302) is provided. The memory (302) is segmented into a plurality of sectors (304–312). A backup memory buffer (312) and a plurality of applications (304–310) are programmed into the plurality of sectors, wherein the backup memory buffer (312) is jointly used by the plurality of applications (304–310). A valid state of data is stored in the backup memory buffer (312) prior to performing a transaction for a first application (304). The valid state of data is restored in the first application (304) upon power up of the portable data device (300) in an event the transaction is terminated prior to completion, wherein the step of restoring is independent of a next application in which a next transaction is performed.

20 Claims, 6 Drawing Sheets

METHOD AND APPARATUS FOR DATA BACKUP AND RESTORATION IN A PORTABLE DATA DEVICE

FIELD OF THE INVENTION

The present invention relates generally to a method and apparatus for data backup and restoration in a smartcard, and in particular, to a method and apparatus for recovering the state of the data if the transaction is improperly terminated.

BACKGROUND OF THE INVENTION

Credit cards, typically provided with magnetic stripes, have been around for many years. These types of credit cards, however, have a design flaw. The mechanical interface between the credit card and the reader requires periodic cleaning. The poor reliability of the readers, due to the mechanical interface, causes down time for reader maintenance. Contactless smartcards have been developed which eliminate the mechanical interface between the card and the reader.

During a transaction, there exists a need to modify data stored in the smartcard's electrically erasable programmable read-only-memory (EEPROM). One of the problems of contactless smartcard applications stems from the ability of the user to terminate the power before the transaction has completed. Removal of the power prior to the completion of the transaction can cause the wrong data to be programmed into the smartcard's memory. This event is termed a tear.

Figure 1:
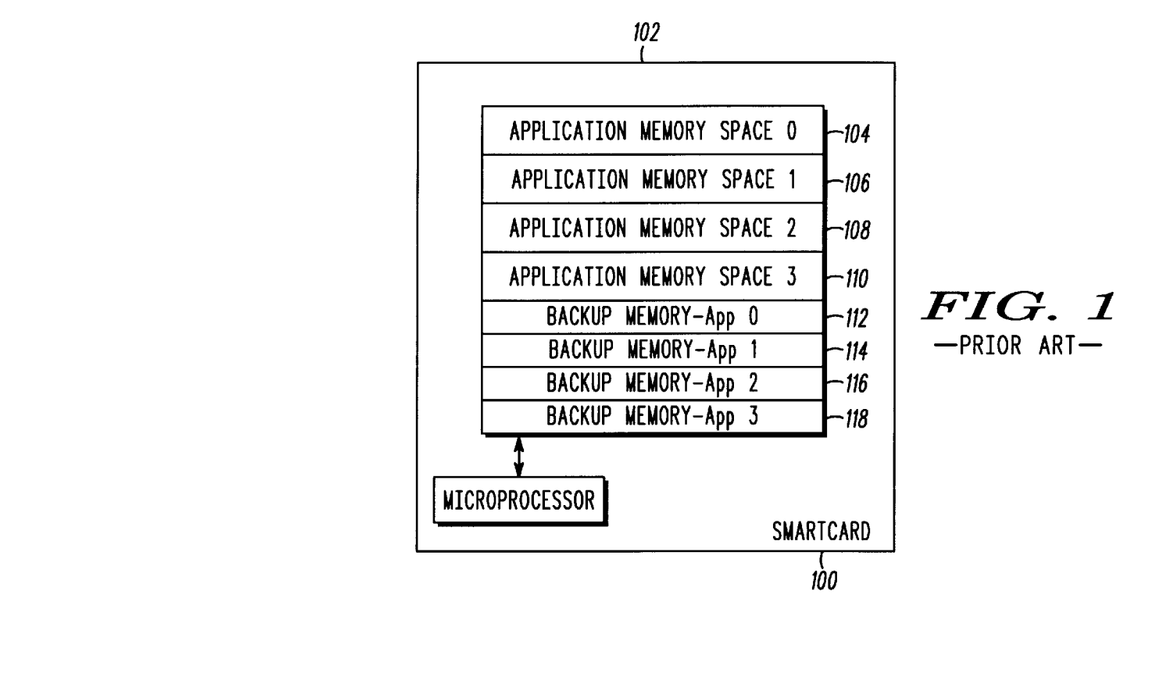
FIG. 1 (prior art) illustrates a block diagram of an electrically erasable programmable read-only-memory (EEPROM) of a smartcard.

The current solution to handling a tear and preventing the wrong data from being programmed into the EEPROM is illustrated in FIG. 1. The EEPROM 102 is segmented into a plurality of sectors of memory. A plurality of applications and a plurality of backup memory buffers are programmed into the plurality of sectors of EEPROM memory. The plurality of backup memory buffers must equal the plurality of applications, thus providing a dedicated backup memory buffer for each application. Using the dedicated backup memories for each application provides the current solution for providing memory correction of a particular application in the event of a tear.

A disadvantage to using a dedicated backup memory buffer for each application programmed on the EEPROM 102 is the large amount of valuable memory space required. The number of bits modified during a transaction can be large resulting in large and expensive dedicated backup memory buffers 112–118. Accordingly, there exists a need for insuring the correct data is restored in the smartcard memory in the event of a tear without seriously impacting the size of the smartcard's memory.

Further, the current state of the art allows the EEPROM 102 to restore the valid state of the data only when the application that experienced the tear is launched. As a result, the valid data remains stored in a dedicated backup memory buffer until the corresponding application is launched. Having the restoration scheme used in the prior art results in a large amount of memory being required and used.

Figure 2:
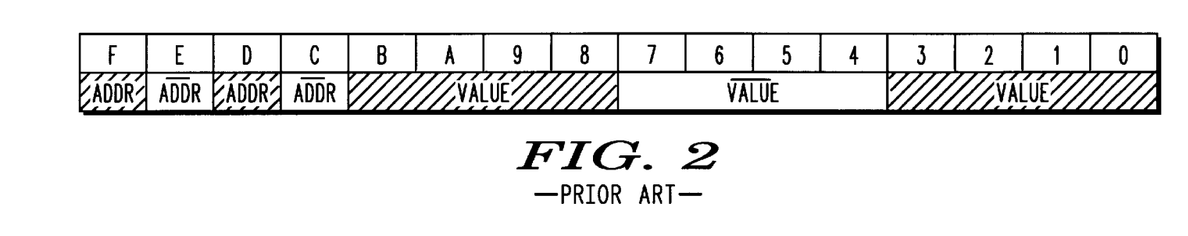
FIG. 2 (prior art) illustrates a data field for the backup memory buffer.

A further disadvantage of the prior art is inadequate security precautions taken to prevent unauthorized modifications to the data stored on the smartcard. Since integrity sensitive applications, e.g., applications storing financial information, are programmed on the smartcard, security against unmodified modification of the data field is required. FIG. 2 displays the memory configuration for the prior art. As shown, the data field locations are fixed for all applications and are public knowledge. Fixed data fields in known locations allow unscrupulous individuals to easily modify the desired data fields since all applications place certain data in the same location (e.g., the first memory block of each sector of memory). Accordingly, there exists a need for placing the data in different locations in order to make it difficult for an unscrupulous individual to determine which data fields should be modified.

Moreover, not only does the prior art store the desired data fields in the same location for all applications, the prior art requires that the desired data field store the desired data in triplicate in order to determine if the data has been mistakenly modified. For example, the actual value is stored twice and the complement of the actual value is stored once. Such a procedure is very cumbersome and also requires a large amount of memory.

Thus, there exists a need to provide a method and apparatus for data backup and restoration in a smartcard that insures that the correct data is stored in memory without seriously impacting the size of the memory while simultaneously providing adequate security of the data.

BRIEF DESCRIPTION OF THE DRAWINGS

A preferred embodiment of the invention is now described, by way of example only, with reference to the accompanying drawings in which.

DETAILED DESCRIPTION OF THE PREFERRED EMBODIMENT

The preferred embodiment of the present invention provides a method and an apparatus for efficient memory usage for data backup and restoration in a portable data device and for recovering the correct state of the data if a transaction is improperly terminated. The preferred embodiment insures that the correct state of the data is stored in a memory shared by all applications programmed on the portable data device in the event the transaction is improperly terminated, without seriously impacting the size of the memory. For ease of explanation and understanding, the following description assumes that the portable data device is a smartcard, even though it can be any type of processing-controlled device (e.g., a microprocessor, a microcomputer, a microcontroller, a dedicated logic element, etc.) capable of executing the methodology and/or steps of the present invention as described in detail below.

The preferred embodiment of the present invention also utilizes a "data backup and restoration" scheme that operates internally to the smartcard. The "data backup and restoration" scheme is defined as the ability to restore the correct state of data for a given memory location when a change to the data is incomplete, such as an incomplete transaction or tear. In the preferred embodiment, the data stored at a given memory location is automatically restored to its correct state upon power up of the smartcard, thus eliminating the need for a backup memory buffer per application. As such, the preferred embodiment of the present invention minimizes the memory overhead required for the "data backup and restoration" scheme, thus allowing for efficient memory storage.

The preferred embodiment further allows an application controller to place data in different memory block locations/data fields within a sector of memory. In accordance with the preferred embodiment of the present embodiment, this operation can be deterministic, pseudo-random or random in nature. An advantage to random placement of the data is that it makes it more difficult for unscrupulous individuals to tamper with the data because they do not know which locations contain valuable data.

Figure 3:
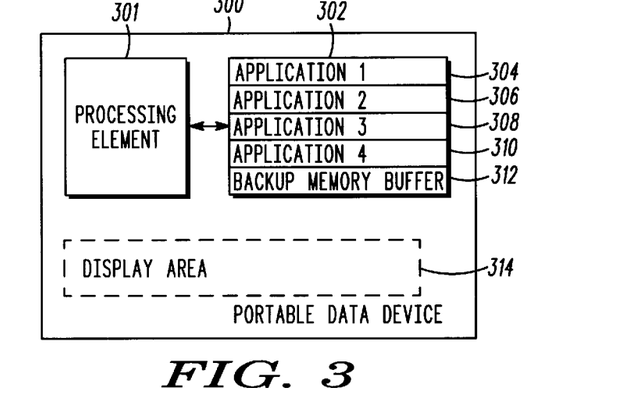
FIG. 3 illustrates a block diagram of an EEPROM of a smartcard in accordance with the preferred embodiment of the present invention.

FIG. 3 illustrates a hardware block diagram of a smartcard 300 in accordance with the preferred embodiment of the present invention. In the preferred embodiment, the smartcard 300 comprises a processing element 301 and a non-volatile memory 302 (e.g., a read-only memory (ROM), an electrically erasable programmable ROM (EEPROM), or the like) that is mapped or segmented into a plurality of sectors 304, 306, 308, 310, 312. For ease of explanation and understanding, the following description assumes that the non-volatile memory 302 in the preferred embodiment is an EEPROM 302. Each user application (e.g., "first application 304","second application 306","third application 308" and "fourth application 310")stored onto the smartcard 300 is allocated a sector of memory in the EEPROM 302.

A backup memory buffer ("backup memory buffer 312")is also allocated a sector of memory 312 in the EEPROM 302. As stated above, the backup memory buffer 312 is commonly used by the plurality of user applications 304–310. It is important to note that regardless of the number of user applications 304–310 stored on the smartcard 300, there is only one backup memory buffer 312 in accordance with the preferred embodiment of the present invention.

For ease of explanation and for example purposes only, the smartcard 300 illustrated in FIG. 3 has four user applications 304–310 associated therewith. For purposes of this discussion, a user application may be controlled, in whole or in part, by an application controller (not shown in FIG. 3). Such application controllers have in the past controlled user applications of smartcards, such as, for example, retail applications, restaurant applications, transit applications, college campus applications and the like. By way of example, the first application 304 may be controlled by a restaurant, the second application 306 may be controlled by a taxi cab service, a third application 308 may be controlled by a retail store 308 and a fourth application 310 may be controlled by a bus service.

As will be appreciated by those skilled in the art, user applications may be stored, loaded, programmed, installed and/or the like, into the EEPROM 302 of the smartcard 300 in a variety of ways. For example, a user can have a blank formatted smartcard 300 where the user takes the smartcard 300 to each individual application controller for programming. Alternatively, the individual application controller (e.g., a bank, a restaurant, a transit authority, etc.) pre-selects the user applications loaded onto the smartcard 300. Additionally, the user may select the user applications on the smartcard 300 from a list of user applications provided by the application controller.

The number of user applications associated with a particular smartcard 300 is configurable based on the amount of total memory available on the smartcard 300 and the amount of memory blocks allocated to a particular user application. Configuring the number of memory blocks allocated to a particular user application 304 is based upon the manufacturing design of the smartcard 300. The smartcard 300 has application-defined value and non-value block mapping. As stated above, each user application 304–310 is allocated a sector of memory having a unique set of memory block locations. Each sector of memory 304–310 can be programmed to fit the user application. The application controller identifies each memory block in its sector of memory as a value block storing value data or a non-value block storing non-value data. Value blocks and non-value blocks may occur in any combination (i.e., coexist) within a user application.

Value data is any information that requires a high level of integrity and backup management during data modification. Examples of value data are the amount of money available for the application, the number of tokens available for the application, the number of purchases/rides/points accrued in order to receive a free gift/ride/discount, a social security number or a telephone number if used to identify the user, etc.

Figure 4:
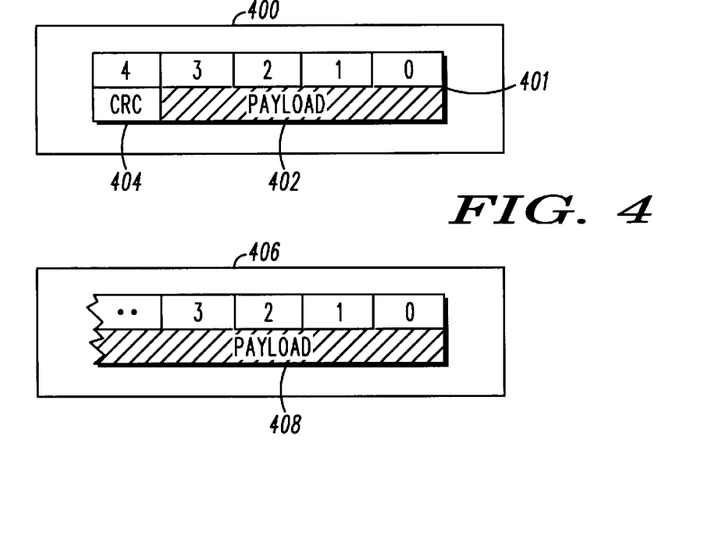
FIG. 4 illustrates a fixed format for a value block and a non-fixed format for a non-value block in accordance with the preferred embodiment of the present invention.

As illustrated in FIG. 4, value blocks 400 have a fixed format, but may reside at any memory block location, preferably determined by the application controller. In the preferred embodiment, the value block 400 comprises forty bits, or five bytes, which make up the value data 401: thirty-two payload bits 402 and eight cyclic redundancy check (CRC) generated parity bits 404. Since the value data401 is very sensitive to data integrity problems, the CRC generated parity bits 404 are attached to the payload bits 402 in order to identify any changes in the payload bits 402.

Non-value blocks 406 do not have a fixed format and thus can be any integral number of bytes. Non-value blocks 406 may also reside at any memory block location, preferably determined by the application controller. In the preferred embodiment, non-value data 408 is comprised of only payload bits. CRC generated parity bits are not a part of the non-value data 408 in the preferred embodiment of the present invention because the non-value data 408 is not particularly sensitive to data integrity issues as is the value data 401.

Non-value data 408 is any information that does not require a high level of integrity or backup management. Examples of non-value data 408 are history information, the user's birthday, the user's address, etc. An advantage of identifying a given location as a value bock 400 or a non-value block 406 allows the smartcard 300 to use less memory when performing various transactions.

For security precautions, the application controller has the freedom and flexibility to randomly store any type of data (value 401 or non-value 408) in any memory block location in its sector of memory. The application controller can also change the location of its value and non-value blocks 400, 406 at any time, especially if it believes its security has been compromised, and maintain the backup feature for its value block/data.

For additional security precautions, the smartcard 300 can vary the order of the user applications 304–310 so that the user applications 304–310 are not necessarily stored on the smartcard 300 in the order in which they were programmed, stored, loaded, installed and/or the like.

Optionally, the smartcard 300 further comprises a display area 314 to allow the user to read text messages from the user application and/or the application controller. Examples of text messages are the following: "$2.00 has been deducted from your account. Your remaining account balance is $10.38";"Your transaction is being processed";"Your account balance has been exceeded, please call 1-800-555-5555";"You will receive a 10% discount on your next purchase";etc.

Figure 5:
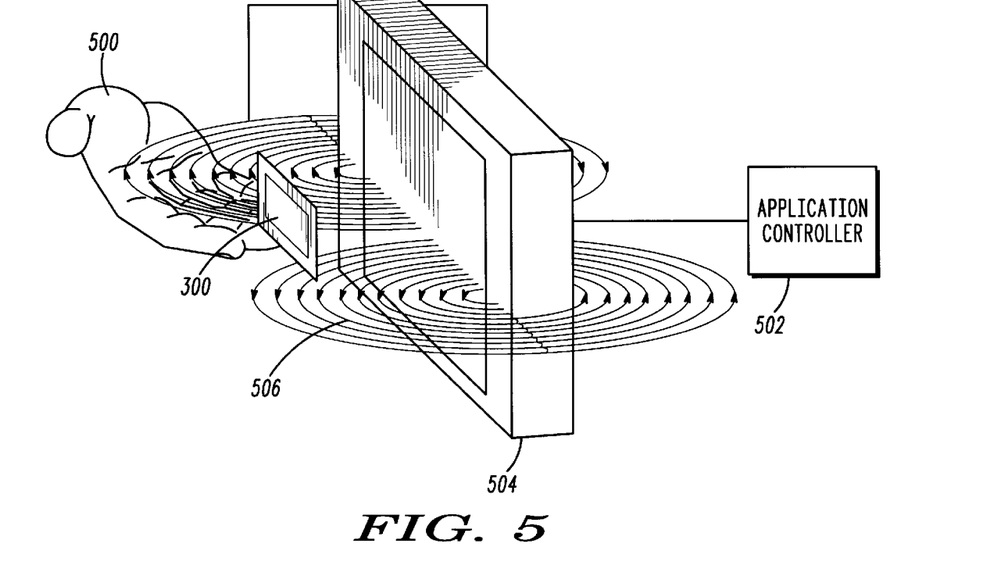
FIG. 5 illustrates an environment in which the smartcard is implemented in accordance with the preferred embodiment of the present invention.

The following discussion is now directed to how a transaction is performed. A transaction is an exchange of data between the application controller and the user via the smartcard and a reader. As shown in FIG. 5, the user 500 controls the smartcard 300 and the application controller 502 controls the reader 504. For purposes of this discussion, a user application 304 is controlled, in whole or in part, by an application controller 502 (e.g., retailers, restaurants, transit authorities, etc.). In the preferred contactless embodiment of the present invention, the smartcard 300 is powered upon entry into a radio frequency (RF) field 506, or alternatively, receipt of an infrared (IR) signal (not shown), In a contact environment, the smartcard 300 is powered upon coming into electrical contact with the reader 504 which applies power to the smartcard 300.

Figure 6:
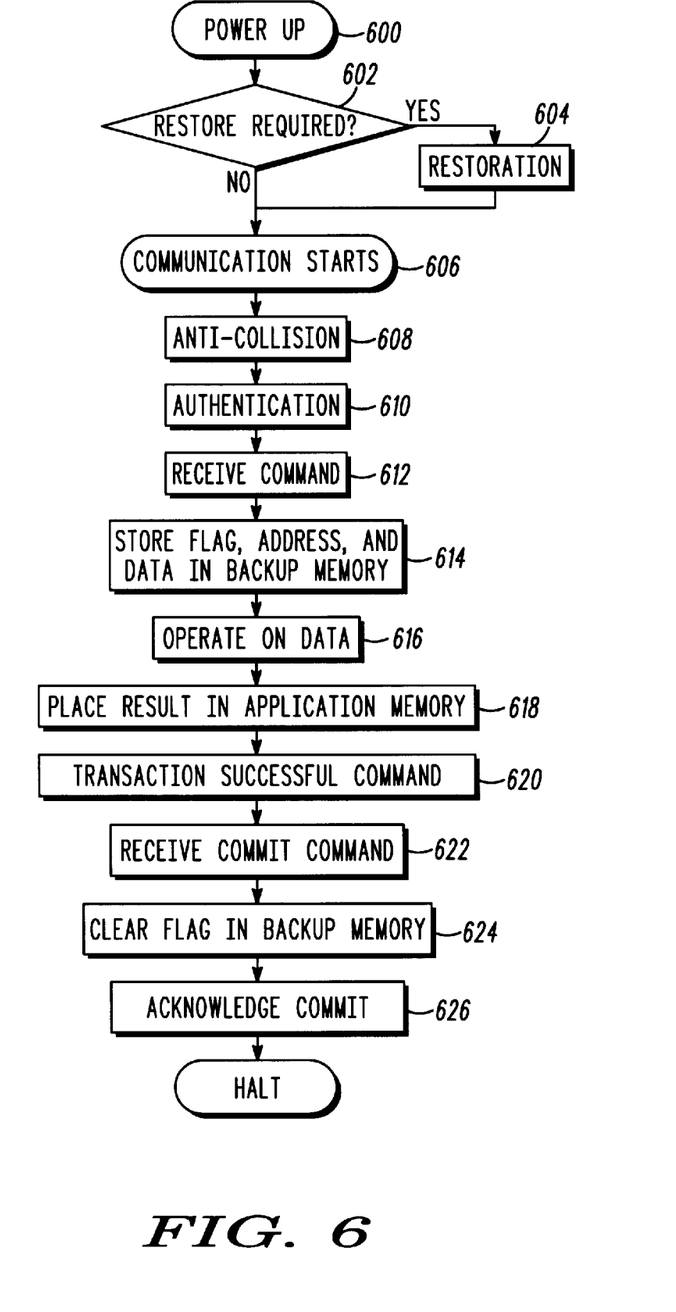
FIG. 6 illustrates a flow chart of a successful transaction in accordance with the preferred embodiment of the present invention.

FIG. 6 illustrates a typical transaction in accordance with the preferred embodiment. For example, when the user 500 wants to use his smartcard 300 to purchase a hamburger from a restaurant (first application) 304 for two dollars ($2.00), the user 500 places the smartcard 300 in a position where the reader 504 for the first user application 304 can supply power to the smartcard 300 at step 600. When the reader 504 supplies power to the smartcard 300, the smartcard 300 determines whether the data stored in the backup memory buffer 312 is the correct state of a memory block location, thus requiring the data stored in the backup memory buffer 312 to be restored to its original location at step 602. Details of restoring the correct state of data to its original location at step 604 are discussed in greater detail with reference to FIG. 8 below. As such, it is assumed that data restoration is not required for this example illustrated in FIG. 6.

Communication is initiated between the smartcard 300 and the reader 504 by executing a protocol amongst themselves at step 606. Such communication protocols are well known in the art of data networking and/or smartcard design and therefore requires no additional description or discussion. Suffice it to say, however, the protocol provides anti-collision protection when multiple smartcards are presented to the reader 504 at step 608, and checks the authenticity of the reader 504 and the smartcard 300 at step 610, among other things.

After the protocol is complete, the reader 504 instructs the smartcard 300 at step 612 to subtract $2.00 for the hamburger from a given memory block location (byte and line address) via a VALUE or NON-VALUE DATA command. If the smartcard receives a VALUE DATA command at step 612, the processing element 301 will treat the memory block location as a value block 400 storing value data 401. If the smartcard 300 receives a NON-VALUE DATA command at step 612, the processing element 301 will treat the memory block location as a non-value block 406 storing non-value data 408. As a result, if the smartcard 300 receives a NON-VALUE DATA command at step 612 from the reader 504 identifying a memory block location that is storing value data 401, the processing element 301 processes the value data 401 as non-value data 408. If the smartcard 300 receives a VALUE DATA command at step 612 identifying a memory block location that stores non-value data 408, the processing element 301 processes the non-value data 408 as value data 401. Processing non-value data 408 as value data 401, however, results in an ERROR command issued by the smartcard 300 because the processing element 301 checks the CRC generated parity bits 404, which is not present in non-value data 408. Thus, the processing element 301 does not necessarily correct incorrect commands received from the reader 504, but rather processes the data in accordance to the type of command received at step 612.

In this particular example, the reader 504 transmits a VALUE DATA command to the smartcard at step 612. The processing element 301 responds to the reader 504 by accessing the given memory block location and processing the stored data as value data 401 by implementing the "data backup" scheme at step 614. The "data backup" scheme 614 allows the processing element 301 to copy the value data 401 currently stored in the given memory block location into the backup memory buffer 312 along with the address of the given memory block location in order to create backup data 401'.

Figure 7:
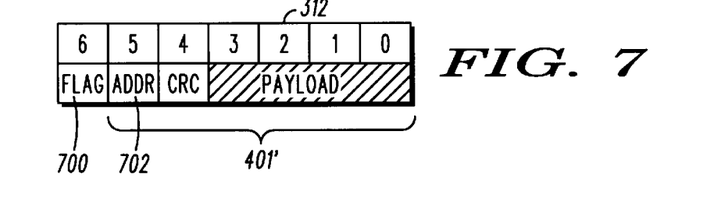
FIG. 7 illustrates a bit allocation for the backup memory buffer in accordance with the preferred embodiment of the present invention.

In the preferred embodiment, as shown in FIG. 7, when the value data 401 is written into the backup memory buffer 312, fifty-two bits are need to accommodate the backup data 401': one flag bit 700, eleven address bits 702, thirty-two payload bits 402 and eight CRC generated parity bits 404. The allocation of bits is, however, configurable.

Referring back to FIG. 6, upon duplicating the value data 401, along with the address 702 of the given memory block location, into the backup memory buffer 312, the processing element 301 sets the flag bit 700. Preferably, the flag bit 700 is located within the backup memory buffer 312, but in alternative embodiments, the flag bit 700 could be located anywhere within the smartcard 300. Setting the flag bit 700 indicates that the transaction is incomplete and the backup data 401' currently stored in the backup memory buffer 312 is the correct state of the data (i.e., valid data) for the address 702 corresponding to the given memory block location. Up to this point, the value of the value data 401 stored at the memory block location and the value of the backup data 401' stored at the backup memory buffer are the same. As such, if an interruption or tear occurs before any changes are made to the value data 401 stored at the memory block location, the value data 401 at the given application memory location is still intact, and the smartcard 300 accepts the value data 401 as the correct state of the given memory location.

Once the value data 400 has been copied and stored in the backup memory buffer 312 along with its given application memory location address 702 at step 614, only then does the processing element 301 begin manipulating the value data 401 stored at the given application memory location in order to perform the operation required for the transaction at step 616. If an interruption or tear occurs after the value data 401 stored at the given application memory location has undergone any manipulation, the processing element 301 accepts the backup data 401' stored in the backup memory buffer 312 as the correct state of the given memory block location identified by the stored address 702 (described in detail below with reference to FIG. 8).

In the present example, the reader 504 instructs the processing element 301 to subtract two dollars from the amount stored at the given application location. The processing element 301 performs the operation (subtracting two dollars), calculates a new value derived from the operation and stores the new value data (not shown) at the given application memory location at step 618. The processing element 301 then informs the reader 504 that the transaction has been completed (TRANS SUCCESS command) at step 620. Optionally, the processing element 301 can inform the reader 504 of the new value data.

At some point after the reader 504 receives the TRANS SUCCESS command from the smartcard 300, the reader 504 must respond with a COMMIT command in order to proceed with the transaction from the standpoint of the application controller. If a COMMIT command is not received from the reader 504, the transaction fails and is deemed incomplete. In the preferred embodiment, if the application controller desires to proceed with the transaction, the reader 504 transmits the COMMIT command after receiving the TRANS SUCCESS command. In alternative embodiments, if the application controller desires to proceed with the transaction, additional commands could still be exchanged between the reader 504 and the smartcard 300 before the reader 504 transmits the COMMIT command to the smartcard 300.

In this example, the smartcard 300 receives the COMMIT command at step 622. As a result, the processing element 301 clears the flag bit 700 at step 624 and sends an acknowledgement (ACK COMMIT command) back to the reader 504 at step 626. Clearing the flag bit 700 indicates that the backup data 401' currently stored in the backup memory buffer 312 is invalid and can be overwritten. Clearing the flag bit 700 also indicates that the new value data stored in the given application memory location is valid and the processing element 301 accepts the new value data as the correct state for the given memory block location After the reader 504 receives the ACK COMMIT command from the smartcard 300, the reader 504 indicates to the restaurant employee to give the holder 500 of the smartcard 300 the hamburger. Thus, in the preferred embodiment, a transaction is complete (and the backup data 401' stored in the backup memory buffer 312 becomes invalid) only after the reader 504 transmits the COMMIT command and the smartcard 300 transmits the ACK COMMIT command in response thereto.

A further scenario from the previous example is when there is not enough money in the given application memory location to purchase the hamburger. The smartcard 300 informs the reader 504 of the non-sufficient funds (NSF) by sending the reader 504 a NSF command instead of the TRANS SUCCESS command. Optionally, the smartcard 300 can provide the actual negative value that resulted after the operation was performed, or the like, to the reader 504 along with the NSF command. At this point, the reader 504 has the option of allowing the transaction to proceed even though there are NSF in the given application memory location. For example, if the user 500 has been a good-standing consumer for a period of time, the application controller 502 may desire to give or "float" the money to the user 500 by sending the smartcard 300 the COMMIT command. The transaction will then continue as described above.

Situations arise when the transaction is incomplete. Such a situation is called a "tear". A tear is caused for a variety of reasons. A tear commonly occurs when the smartcard 300 loses power, such as, but not limited to, when the smartcard is moved beyond the range of the RF field 506 or stops receiving the IR signal in a contactless environment. The smartcard 300 also loses power when there is no longer any electrical contact between the smartcard 300 and the reader 504 in a contact environment. In the situation when a battery supplies the power the smartcard 300, a tear occurs when the battery loses its charge before the transaction is complete. As such, a tear occurs when the user 500 of the smartcard 300 changes his/her mind about completing the transaction, the reader 504 and/or the smartcard 300 picks up interfering signals from outside sources, the electrical contact is not strong enough, etc. A tear will also occur if the reader 504 does not transmit a COMMIT command prior to the smartcard 300 losing power or if the smartcard 300 does not transmit an ACK COMMIT command prior to the smartcard 300 losing power.

Figure 8:
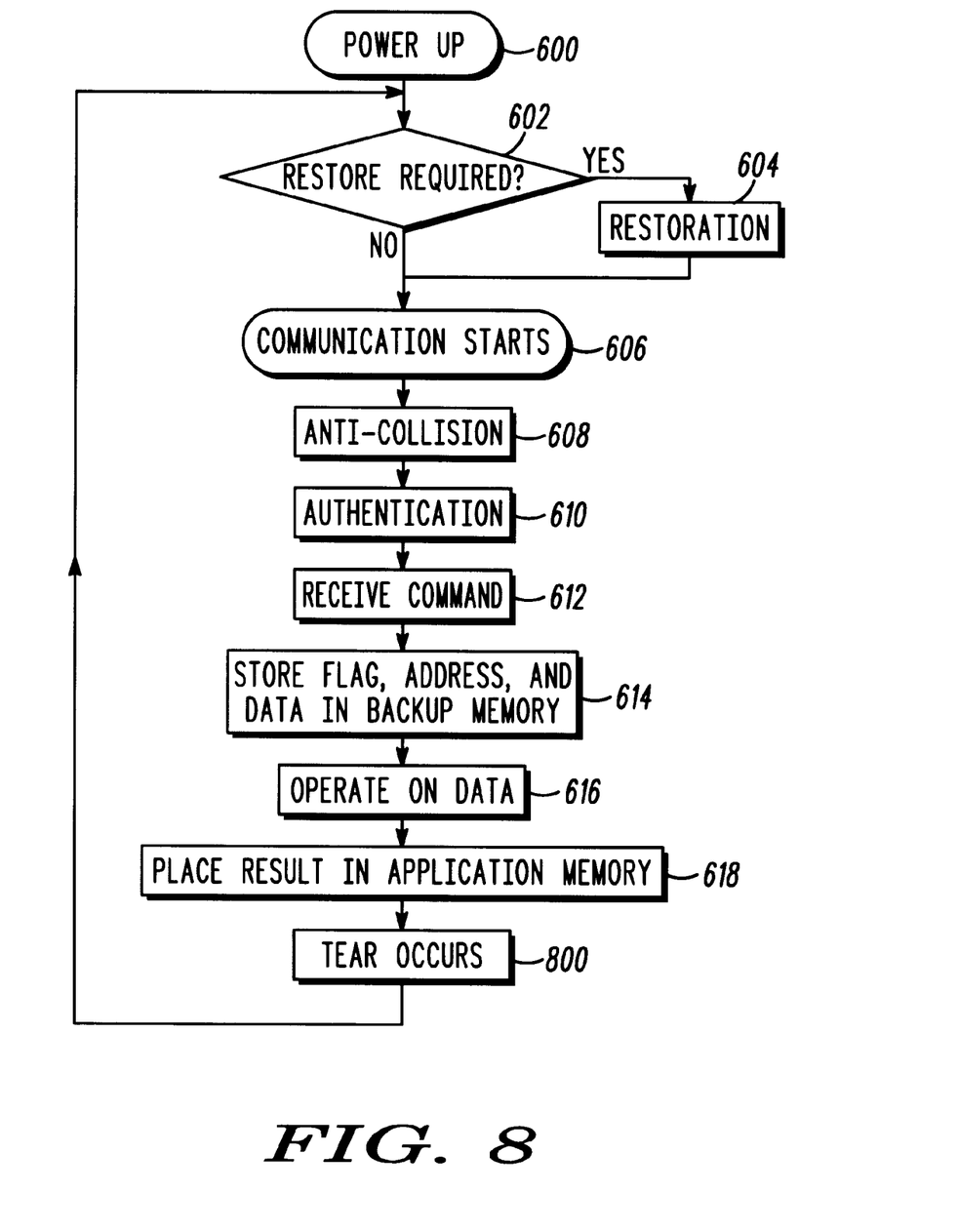
FIG. 8 illustrates a flow chart of an unsuccessful transaction in accordance with the preferred embodiment of the present invention.

As illustrated in FIG. 8, in the preferred embodiment of the present invention, when the smartcard receives power at step 800, the smartcard 300 determines if restoration is required at step 602 by determining the status of the flag bit 700 (i.e., whether the backup memory buffer 312 contains valid or invalid data). If the flag bit 700 is clear, the backup memory buffer 312 contains invalid data (indicating that the correct state of the data is stored in the memory block location identified by the address stored in the backup memory buffer 312) and the smartcard 300 begins the transaction at step 606 with the reader 504 as described above with reference to FIG. 6.

If the flag bit 700 is set or valid data is found in the backup memory buffer 312, this indicates that an incomplete transaction or a tear occurred and the smartcard 300 implements the "data restoration" scheme at step 604. The "data restoration" scheme accesses the backup memory buffer 312 and identifies the address 702 stored therein. Once the address 702 is identified, the processing element 301 writes the backup data 401', also stored within the backup memory buffer 312, in the given memory block location corresponding to the address 702. The backup data 401' is considered the correct state (i.e., valid) because any changes made to the value data 401 after being copied into the backup memory buffer 312 has not been committed to or approved by both the reader 504 and the smartcard 300. It is important to be able to restore the data in the given memory block location to its correct state in case a tear, premature termination or incomplete transaction occurs. It is also important to note that the "data restoration" scheme 604 is done independent of the reader 504 or its application 304. In other words, the processing element 301 automatically recovers from an incomplete transaction or a tear upon receiving power, independent of a next reader supplying power to the smartcard 300, the next application launched (whether the first application 304, the second application 306, etc.) and/or the next memory block location accessed (whether a value block 400 or a non-value block 406).

Once the backup data 401' stored in the backup memory buffer 312 is restored in the given application memory location 702, the processing element 301 clears the flag bit 700 and begins the transaction with the reader 504 as described above.

Figure 9:
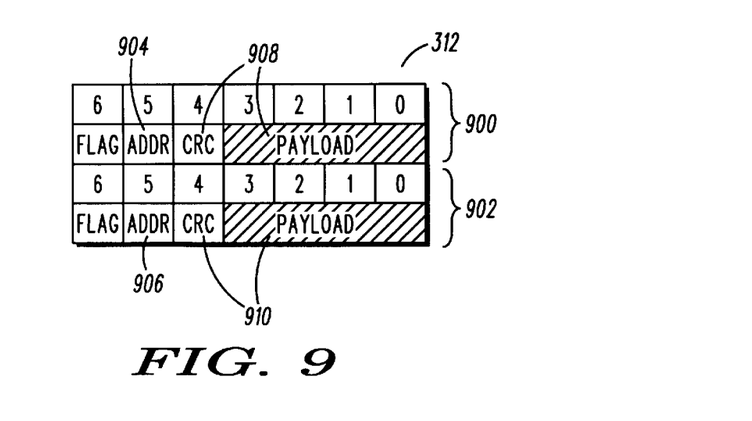
FIG. 9 illustrates a bit allocation for the backup memory buffer in accordance with an alternative embodiment of the present invention.

In an alternative embodiment the backup memory buffer 312 can be formatted into a plurality of segments. The number of segments is configurable. In each segment, the backup memory buffer 312 stores value data 401 in a given application 304 at a single time. Storing multiple value data 401 from multiple value blocks 400 allows the smartcard 300 and the reader 504 to complete a transaction on a plurality of value blocks 400 simultaneously.

For example, as shown in FIG. 9, the backup memory buffer 312 is segmented into two segments 900, 902. When a user 500 uses his smartcard 300 to ride the city bus, a reader 504 for a user application 310 sends a command to the smartcard 300 to identify a first location 904 to decrement the fare and a second location 906 to increment the number of rides accrued before receiving a free ride. The value data 908, 910 associated with both the first and second locations 904, 906 are copied into the backup memory buffer 312 in designated segments 900, 902 of the backup memory buffer 312 before the processing element 301 decrements the fare from the first value data 908 and increments the number of rides from the second data value 910. The transaction is complete for all value data 908, 910 stored in the backup memory buffer 312 (in this case, the fare and the number of rides) when the reader 504 transmits the COMMIT command and the smartcard 300 transmits the ACK COMMIT command. Thus, a single COMMIT command from the reader 504 and a single ACK COMMIT command from the smartcard 300 completes the transactions for all value data (in this case, 908, 910) stored in the backup memory buffer 312.

Figure 10:
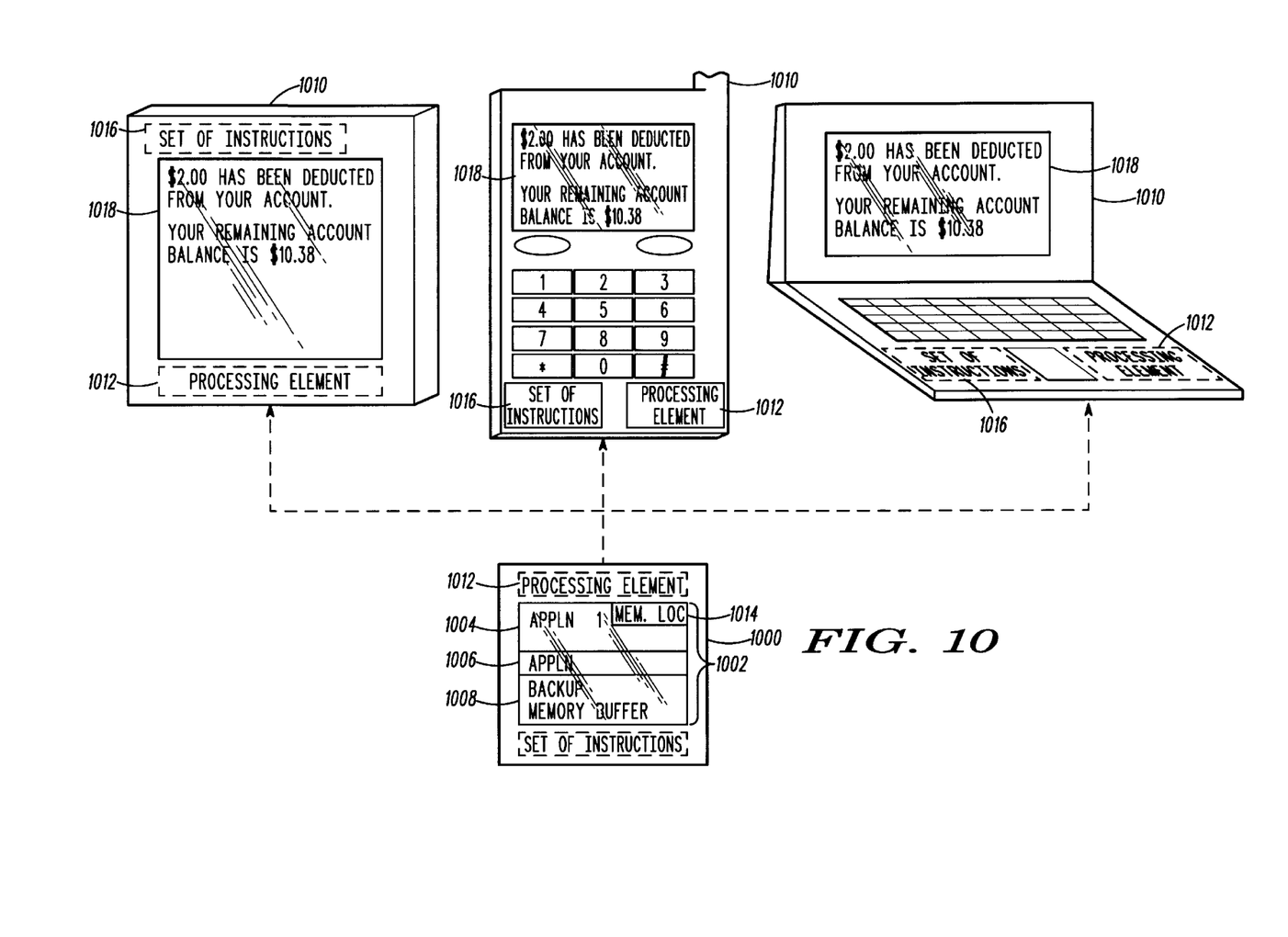
FIG. 10 illustrates an alternative environment in which a portable data device and a storage medium is implement in accordance with a further alternative embodiment of the present invention.

While the invention has been described in conjunction with a specific embodiment thereof, additional advantages and modifications will readily occur to those skilled in the art. For example, a further alternative embodiment is shown in FIG. 10, a storage medium 1000 having stored thereon a plurality of user applications 1004, 1006 and a backup memory buffer 1008 which, when loaded into a portable data device 1010 having a processing element 1012, causes the processing element 1012 to perform the following functions: share the backup memory buffer 1008 with the plurality of user applications 1004, 1006; store a valid state of data from a memory location 1014 in the storage medium 1000 into the backup memory buffer 1008 prior to performing a transaction for an application; and restore the valid state of data from the backup memory buffer 1008 into the memory location 1014 upon receiving power at the portable data device 1010 in an event the transaction is terminated prior to completion, independent of a next application in which a next transaction is performed. A set of instructions 1016 which instructs the processing element 1012 to perform the functions can either be stored on the storage medium 1000, or alternatively on the portable data device 1010.

In addition, the storage medium 1000, when loaded into the portable data device 1010, could also cause the processing element 1012 to perform the functions described in FIG. 6 and/or FIG. 8.

In the further alternative embodiment illustrated with respect to FIG. 10, the portable data device 1010 is a personal digital assistant, a cellular telephone, a laptop computer or any other portable device that is capable of receiving the storage medium 1000. The portable data device 1010 optionally comprises a display area 1018 to allow the user 500 to read text messages from a user application and/or application controller as in the preferred embodiment (shown in FIG. 3).

The storage medium device 1000, such as a diskette, cartridge, smartcard, compact disc (miniature or full size) or any other medium capable of storing thereon the plurality of user applications 1002, 1004, 1006 the backup memory buffer, the processing element 1012 and the set of instructions 1016, singularly or in any type of combination, is inserted into the portable data device 1010.

The processing element 1012 is a microprocessor, microcomputer, microcontroller, a dedicated logic element or any other processing element capable of executing the methodology and/or steps of the present invention as described in detail above.

In yet a further embodiment, the storage medium 1000 could have the set of instructions 1016, a non-volatile memory 1002 and a processing element 1012 stored thereon, wherein the non-volatile memory 1002 is mapped into a plurality of segments 1004, 1006, and having a backup memory buffer 1008 which, when loaded into the portable data device 1010, causes the storage medium 1000 to perform the following functions: share the backup memory buffer 1008 with the plurality of user applications 1004, 1006; store a valid state of data from a memory location 1014 in the nonvolatile memory 1002 into the backup memory buffer 1008 prior to performing a transaction for a user application; and restore the valid state of data from the backup memory buffer 1008 into the memory location 1014 upon power up of the portable data device 1010 in an event the transaction is terminated prior to completion, independent of a next application in which a next transaction is performed.

In addition, the set of instructions stored on the storage medium 1000 could cause the storage medium 1000 to perform the functions of FIG. 6 and/or FIG. 8. As such, the plurality of user applications 1004, 1006 and the backup memory buffer 1008 could reside on either the storage medium 1000 or the portable data device 1010, and the set of instructions 1016 used to perform any of the functions described above can reside either on the storage medium 1000 or the portable data device 1010.

Thus, the invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A data backup and restoration method for a portable data device comprising the steps of:
   mapping a memory device into a plurality of segments, and having a backup memory buffer;
   loading a plurality of user applications into the plurality of segments, wherein the backup memory buffer is shared by the plurality of user applications;
   storing a valid state of data from a memory location into the backup memory buffer prior to performing a transaction for an application; and
   restoring the valid state of data from the backup memory buffer into the memory location upon power up of the portable data device in an event the transaction is terminated prior to completion, wherein the step of restoring is independent of a next application in which a next transaction is performed.

2. The data backup and restoration method in accordance with claim 1 wherein the portable data device is a smartcard.

3. A data backup and restoration method for use within a portable data device having a memory device segmented into a plurality of sectors, the memory device further comprising a backup memory buffer, the data backup and restoration method comprising the steps of:

receiving power from a reader;

receiving a command from the reader to access data stored at a memory location within the memory device, wherein the data is used to perform a transaction;

copying the data from the memory location into the backup memory buffer, in order to create backup data, prior to performing the transaction;

setting a flag bit, in response to copying the data, to indicate that the transaction is incomplete;

determining a status of the flag bit upon a next receipt of power from a reader; and copying the backup data into the memory location when the status of the flag bit is set, wherein the step of copying the backup data is independent of a reader.

4. The data backup and restoration method in accordance with claim 3 wherein a reader is controlled by an application controller, and wherein the step of copying the backup data is also independent of the application controller.

5. The data backup and restoration method in accordance with claim 4 wherein the application controller is one of the following: a retail store, a restaurant, a bank, a transit authority and a college campus.

6. The data backup and restoration method in accordance with claim 3 further comprising clearing the flag bit only when the transaction is successfully completed.

7. The data backup and restoration method in accordance with claim 6 wherein the transaction is successfully completed when both the portable data device and the reader agree to commit to the transaction.

8. The data backup and restoration method in accordance with claim 3 wherein the step of receiving power comprises entering a radio frequency field exerted from the reader.

9. The data back and restoration method in accordance with claim 3 wherein the step of receiving power comprises transmitting an infrared signal to the reader.

10. The data backup and restoration method in accordance with claim 3 wherein the step of receiving power comprises establishing an electrical contact with the reader.

11. The data backup and restoration method in accordance with claim 3 further comprising loading a plurality of user applications into the plurality of sectors, each user application being controlled by an application controller and each sector having a unique set of memory block locations, wherein each application controller programs any type of data in each memory block location within a sector.

12. The data backup and restoration method in accordance with claim 11 wherein the application controller can move data programmed in a first memory block location to a second memory block location at any given time.

13. The data backup and restoration method in accordance with claim 11 wherein the sector in which a particular user application is loaded into is independent of an order in which the particular user application is loaded onto the portable data device.

14. A data backup and restoration method for use within a portable data device having a memory device segmented into a plurality of sectors, the memory device further comprising a backup memory buffer, the data backup and restoration method comprising the steps of:

receiving power from a reader;

receiving a command from the reader to access first data stored at a first memory location in the memory device and second data stored at a second memory location in the memory device, wherein the first and second memory locations are controlled by the reader, and wherein the first data and the second data are used to perform a transaction;

copying the first data from the first memory location into a first segment of the backup memory buffer in order to create a first backup data and copying the second data from the second memory location into a second segment of the backup memory buffer in order to create a second backup data prior to performing the transaction;

setting a flag bit, in response to the step of copying the first data, to indicate that the transaction is incomplete;

upon a next receipt of power from a reader, determining a status of the flag bit; and copying the first backup data into the first memory location and copying the second backup data into the second memory location when the status of the flag bit is set, wherein the step of copying the first backup data is independent of a reader.

15. A data backup and restoration apparatus having stored thereon a plurality of user applications and a backup memory buffer, the backup memory buffer being common to the plurality of user applications, when the data backup and restoration apparatus receives power from a reader in order to perform a transaction on data stored at a memory location, the data is copied from the memory location into the backup memory buffer prior to performing the transaction, and upon a next receipt of power from a reader, the data is copied from the backup memory buffer into the memory location in an event the transaction is terminated prematurely independent of a reader.

16. The data backup and restoration apparatus in accordance with claim 15 further comprising an electrically erasable programmable read-only-memory in which the plurality of user applications and the backup memory buffer are stored.

17. The data backup and restoration apparatus in accordance with claim 15 wherein the data backup and restoration apparatus further comprises a display area.

18. A storage medium having stored thereon a plurality of user applications and a backup memory buffer which, when loaded into a portable data device having a processing element, causes the processing element to perform the following functions:

share the backup memory buffer with the plurality of user applications;

store a valid state of data from a memory location in the storage medium into the backup memory buffer prior to performing a transaction for an application; and restore the valid state of data from the backup memory buffer into the memory location upon power up of the portable data device in an event the transaction is terminated prior to completion, independent of a next application in which a next transaction is performed.

19. The storage medium in accordance with claim 18 wherein the portable data device is a personal digital assistant.

20. The storage medium in accordance with claim 18 wherein the portable data device is a cellular telephone.

* * * * *